Sept. 6, 1966   J. P. O'CONNELL   3,270,749
LOOSE LEAF BINDER AND BACKING CONSTRUCTION FOR NOTEBOOKS
Filed Oct. 23, 1965   7 Sheets-Sheet 5

Inventor:
James P. O'Connell,
by
Attorney

Sept. 6, 1966   J. P. O'CONNELL   3,270,749
LOOSE LEAF BINDER AND BACKING CONSTRUCTION FOR NOTEBOOKS
Filed Oct. 23, 1965   7 Sheets-Sheet 6

Inventor:
James P. O'Connell
by
Attorney

United States Patent Office 3,270,749
Patented Sept. 6, 1966

3,270,749
LOOSE LEAF BINDER AND BACKING
CONSTRUCTION FOR NOTEBOOKS
James P. O'Connell, 3 Rosemont St., Malden, Mass.
Filed Oct. 23, 1965, Ser. No. 503,671
9 Claims. (Cl. 129—24)

This application is a continuation-in-part of my copending applications Serial No. 281,522, filed May 20, 1963 entitled Loose Leaf Binder Ring Construction and Serial No. 401,915, filed October 2, 1964, now abandoned.

This invention relates in general to a loose leaf notebook construction and, more particularly, to a loose leaf binder ring and backing arrangement for loosely supporting between notebook covers a plurality of sheets of notebook paper having the conventional loose leaf ring apertures formed therein.

A ring aperture size of one-quarter inch diameter has for many types of notebooks now become standardized and the invention is especially concerned with notebook paper having ring apertures of this size, although it should be understood that the invention is not intended to be limited to this or any other particular ring aperture size or arrangement.

The most common form of notebook for receiving and detachably supporting notebook sheets in a satisfactory manner if of the type utilizing ring sections which can be snapped into open and closed positions as desired. With such a ring construction problems arise in closing the ring sections into smoothly jointed relationship while at the same time providing for convenience in operation.

For example, it frequently happens that interlocking binder ring extremities in moving into an engaging position may fail to abut in a correctly matched relationship to one another. Thus there may result a slight misalignment with projecting edges or surfaces being offset or standing out from the curved-under surfaces of the respective ring portions. When this occurs there may develop, during frequent turning over of notebook sheets, a tendency for the ring apertures in the paper sheets to become enlarged, roughened and, in some cases, torn through in a highly objectionable manner.

The tendency for the ring apertures to become enlarged and torn is further increased in a way not heretofore recognized. The binder ring sections are usually circular in shape and as the notebook becomes completely filled with sheets and is periodically opened and closed, the front and back covers fail to move the sheets so that their ring apertures move in a circular path of travel. Instead the sheets are angled over upon one another and the ring apertures are frequently jammed against the lower portions of the ring sections with the result that the holes are enlarged and often times tearing takes place.

With full recognition of these conditions in mind, I have conceived of an improved notebook construction in which non-circular binder ring sections are arranged between the front and back covers of the notebook in such a way that convenient operability is realized and yet pressure of the cover members on the sheets when the book is completely filled is prevented from jamming the ring apertures against the rings and a smooth turning operation is accomplished with tearing of ring apertures being avoided.

I accomplish these desired results by constructing each binder ring assembly with cooperating ring sections which taper toward one another in a non-circular shape. I also provide for locking the ring sections together in a novel manner so that they cannot be accidentaly disengaged and I support the ring sections in a specially formed backing member. It is, therefore, a chief object of the present invention to provide an improved binder ring and backing construction for notebooks and in general to deal with the various problems indicated above.

Another object of the invention is to devise a loose leaf notebook construction which is characterized by a novel association of notebook backing structure with binder ring sections which can be easily engaged and disengaged, and which will not only resist accidental disengagement when in use, but which will also provide against any gap or misalignment occurring between the ring ends in a closed position.

Another specific object of the invention is to devise a loose leaf binder ring structure in which a plurality of ring sections are formed with uniquely designed ring ends capable in a closed position of providing such a tightly fitted joint that there is presented a smooth contour along the undersurface, the side surfaces, and the top surface at the line of juncture; whereby the ring apertures in loose leaf notebook paper, particularly of the one-quarter inch variety, may slide freely without interference at any point along the line of juncture.

Another object of the invention is to provide cooperating locking ends for a split binder ring construction and to include therein a special locking insert member which can be selectively operated to disengage the ring sections when desired.

Another object of the invention is to provide locking means which are independently operable and which are engaged silently and smoothly without a spring snap action to avoid possible injury to the fingers and to avoid displacing sheets in the opening process when a large number of sheets of paper are present in the notebook.

Another object of the invention is to provide where so desired binder ring sections combined with novel individual anchoring or backing portions which can be separately attached to a binder of a loose leaf notebook.

The nature of the invention and its objects and novel features will be more fully understood and appreciated from the following description of the preferred embodiments of the invention selected for purposes of illustration and shown in the accompanying drawings, in which.

Figures 1, 2, 3:
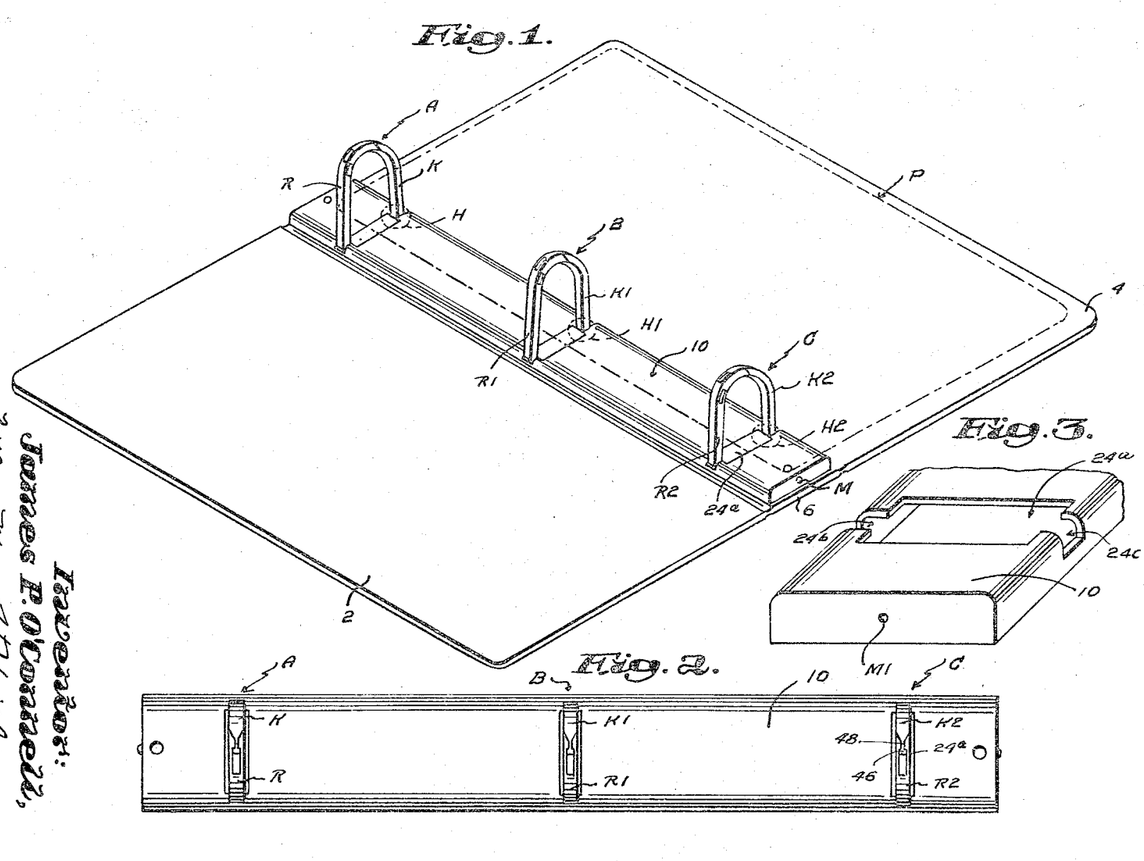
FIGURE 1 is a perspective view of a notebook shown in an opened position to illustrate the binder ring and backing structure of the invention as indicated in a closed position.
FIGURE 2 is a plan view of the binder ring and backing structure removed from the notebook.
FIGURE 3 is a fragmentary perspective view of a retaining cap element constituting the upper portion of the backing structure shown in FIGURES 1 and 2.
Figure 16:
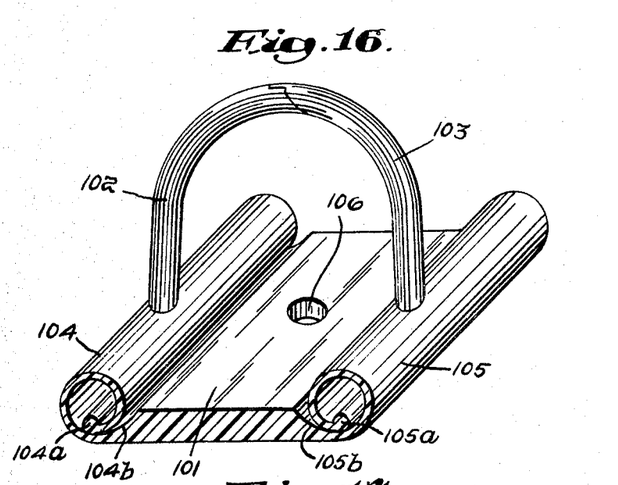
FIGURE 16 is a perspective view of a modified form of ring binder sections and anchoring means therefor.
Figure 17:
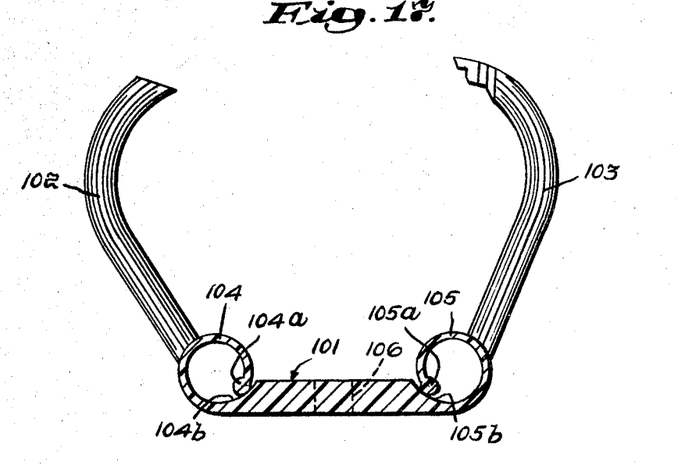
FIGURE 17 is another view of the structure shown in FIGURE 16 and further illustrating the ring sections in an opened position.
Figure 18:
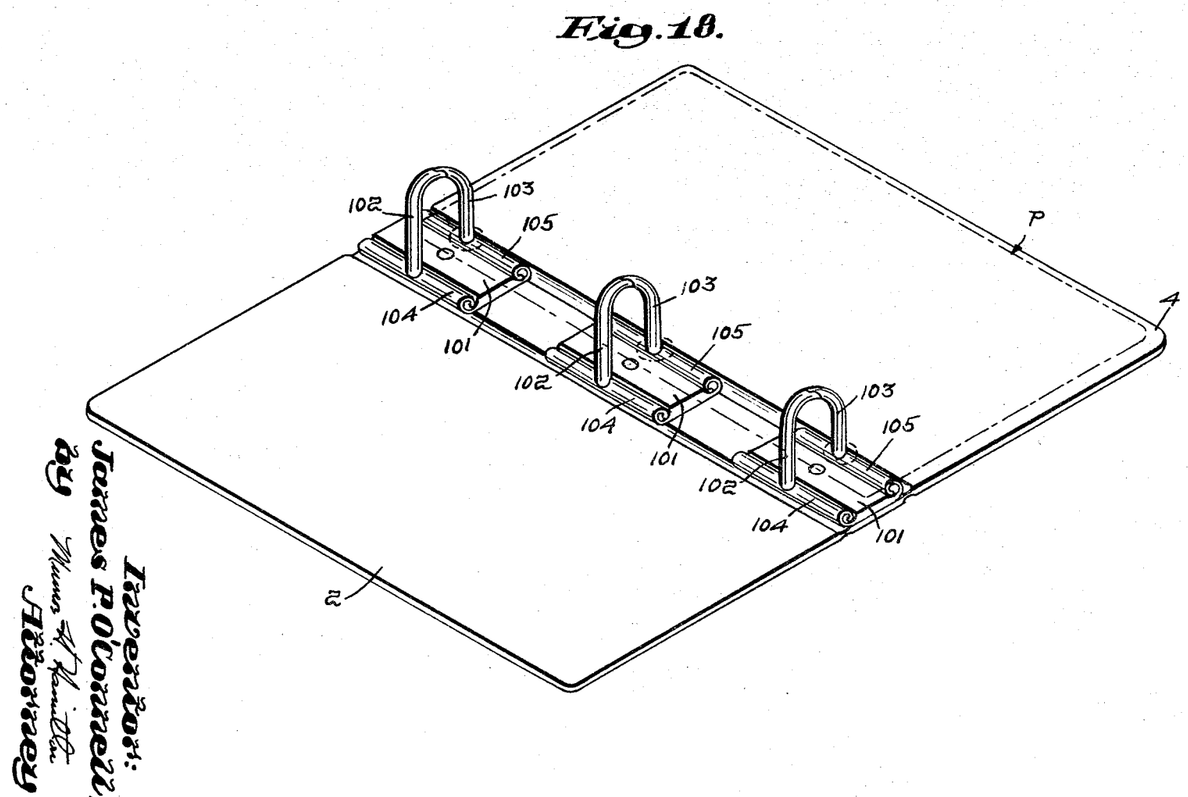
FIGURE 18 is a perspective view of a loose leaf ring binder book illustrating the ring sections of 16 and 17 in an installed position.

The principal parts of the invention are included in the notebook construction generally indicated in FIGURE 1 in which numerals 2 and 4 denote front and back covers respectively attached to one another for hinged movement by a binding portion 6 in the well known manner. Secured between the covers 2 and 4 against the portion 6 is provided ring backing means which in one desired embodiment comprises a novel composite backing structure. This backing structure includes a ring anchoring base 8 and an elongated retainer cap 10 as shown in FIGURE 1. Another desired form of backing structure is shown in FIGURES 16–18 inclusive hereafter described.

Mounted in the backing structure shown in FIGURE 1 are three novel binder ring assemblies generally indicated by arrows A, B and C for detachably receiving notebook paper such as the notebook paper having one-quarter inch ring apertures above described. P indicates a page of notebook paper of the type deferred to, being illustrated in broken lines in FIGURE 1, and shown with ring apertures H, H1 and H2 loosely engaged over the respective binder rings A, B and C.

Figure 14:
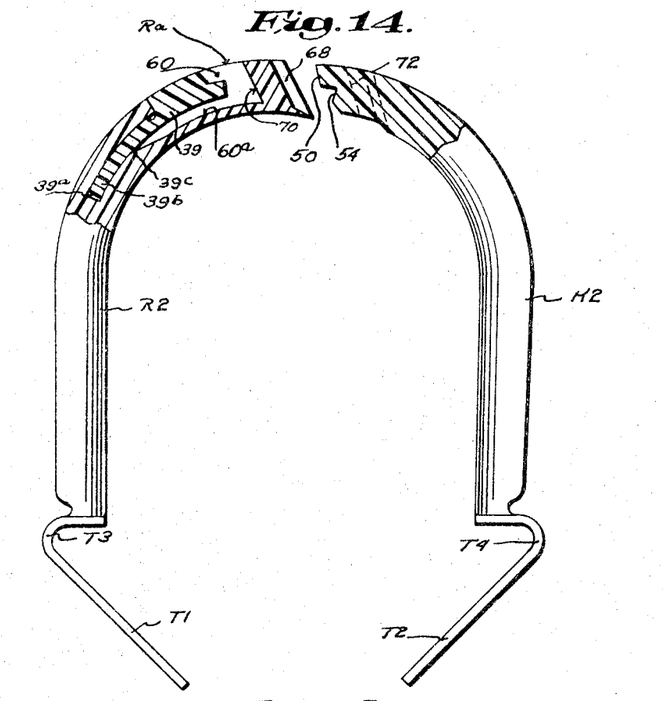
FIGURE 14 is an elevational view partly in cross section showing two fragmentary ring sections of the invention completely removed from the backing structure and particularly indicating the flexible locking tongue.

The backing structure of the invention and mounting of the ring assemblies thereon is illustrated in greater detail in FIGURES 2 to 5 inclusive. FIGURE 14 illustrates separate components of the binder ring C removed from the backing structure and the remaining figures show details of the construction and association of the binder ring A and are intended to be representative of the remaining ring assemblies B and C.

In accordance with the invention, I provide a basically new concept of split ring design in which the ring assemblies A, B and C are compressed by slotted ring sections R, R1 and R2 and novel keying ring sections K, K1 and K2 engageable in the receiver ring sections as hereinafter described in greater detail.

These ring sections may be made of any desired material having some degree of resilience and preferably I may employ a resilient plastic or molded rubber-like material. Attention is directed to binder ring sections R2 and K2 as illustrated in FIGURE 14 removed from the backing structure. As will be observed the binder sections have located at their lower extremities resilient flexing tongues T1 and T2 which are folded over upon themselves to provide resilient hinge portions T3 and T4 and which project downwardly in an angularly disposed manner as shown. These flexing tongues T1 and T2 are preferably constructed of rectangular cross sections and are designed to constitute a convenient means of assembling and resiliently supporting respective ring sections in the slotted backing structure and, in addition, to position the ring sections so that they taper inwardly toward one another to form ring enclosures of non-circular arcs of curvature.

To secure the ring sections in the specific relationship to one another noted, I further construct the ring anchoring base 8 with novel tongue-retaining means. As shown in detail in FIGURES 4 and 5 the ring anchoring base 8 is preferably comprised of a molded plastic or other suitably rigid material formed at its opposite lower sides with relieved edges 14 and 16. Extending vertically upward from the edges 14 and 16 are shouldered portions 18 and 20 and extending between the shouldered portions 18 and 20 are relieved cap-supporting portions 22, 24 and 26, etc.

Figure 4:
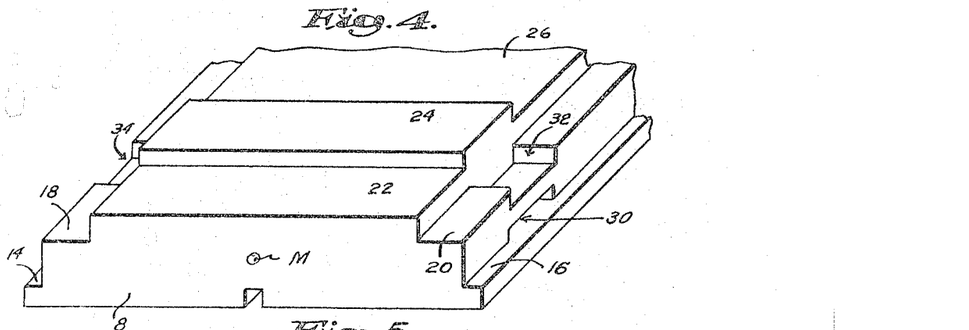
FIGURE 4 is a fragmentary perspective view of an underportion of the backing structure shown in FIGURES 1 and 2 separated from the retainer cap of FIGURE 3.
Figure 5:
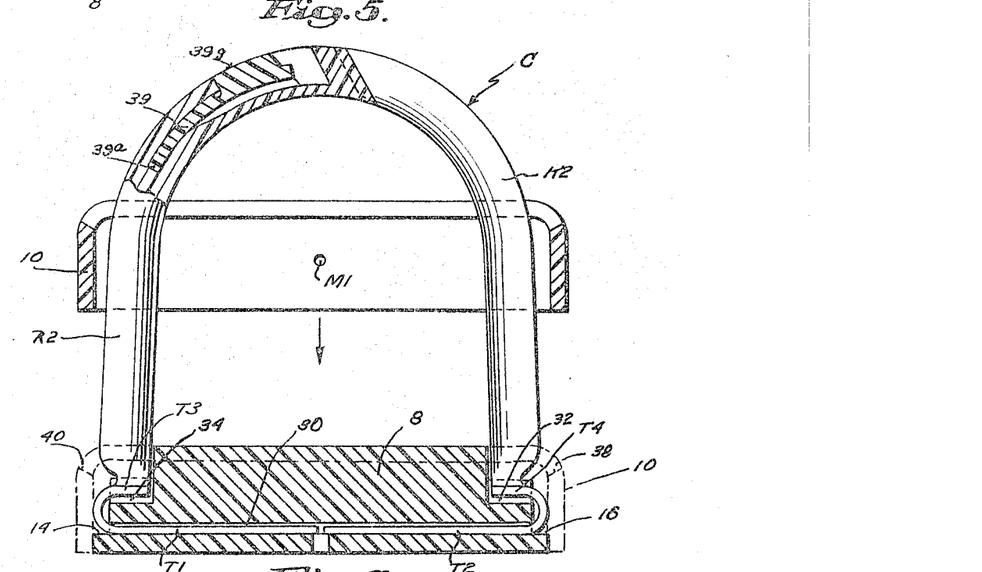
FIGURE 5 is an elevational view partly in cross section of the backing structure and one of the binder ring assemblies mounted therein in a fully closed position.

To secure the cap 10 to the anchor base 8 so that the binder ring assemblies and the backing structure will be held together as a unit as shown in FIGURE 2, and also to facilitate the process of securing such unit to the binding portion 6, I have provided a very small semi-spherical boss M which projects out slightly from the end of the anchoring base 8 as shown in FIGURE 4. It will be observed that this boss is complementary to a recess hole M1 which is formed in the end of the retainer cap 10 as shown in FIGURES 3 and 5. It will be understood that a similar boss is provided in the other end of the anchoring base and that a similar hole is provided in the other end of the retainer cap.

An important feature of this base construction is the provision of tongue-retaining slots 30, 32, 34 for receiving the ring section tongues T1 and T2. It will be understood that similar slots are provided for the ring assemblies A and B. In FIGURES 4 and 5 the tongue retaining slots 30, 32, 34 are shown for the ring sections R2 and K2 with FIGURE 4 showing the slots when the ring sections have been removed. FIGURE 5 shows the ring sections installed and further shows these ring sections being held in a normally closed position such that they are inclined towards one another to provide a non-circular arc of curvature. It is pointed out that the slots 30 extend transversely through the base 8 and the tongues T1 and T2 when inserted therein are thus held in substantially horizontally disposed alignment with one another. In addition, the slots 32 and 34 which occur in register with and directly above opposite ends of the slot 30, are adapted to loosely receive therein respective tongue-hinge portions T4 and T3 in a manner such that the tongue hinge portions T4 and T3 can be flexed into a position as shown in FIGURE 5 whereby the ring sections R2 and K2 can be engaged with one another and yet when these ring sections are disengaged they are free to move apart from one another for a limited distance.

The extent to which the hinge portions may move apart is limited by the elongated retaining cap 10. As is more clearly shown in FIGURES 1 to 3, the cap 10 is adapted to be snugly fitted over the anchoring base 8 and the cap is formed with large slots 24a which terminate at either side of the cap in relatively small arcuate slots 24b and 24c. The large slots permit the cap to fit around the top surfaces 22, 24, 26 of the member 8 as shown in FIGURE 5. It will be apparent that with the cap 10 engaged as shown in broken lines in FIGURE 5, the ring sections R2 and K2 can move apart only to the extent permitted by engagement of these members against slot edges 40 and 38 (FIGURE 5), and therefore each of the resilient tongues are constantly held in tension and exert a light resilient resistance to forces acting to close the ring sections together so that upon disengagement of the ring sections they will always spring apart in a position to receive and permit removal of notebook paper.

Figures 9, 10, 11, 12, 13:
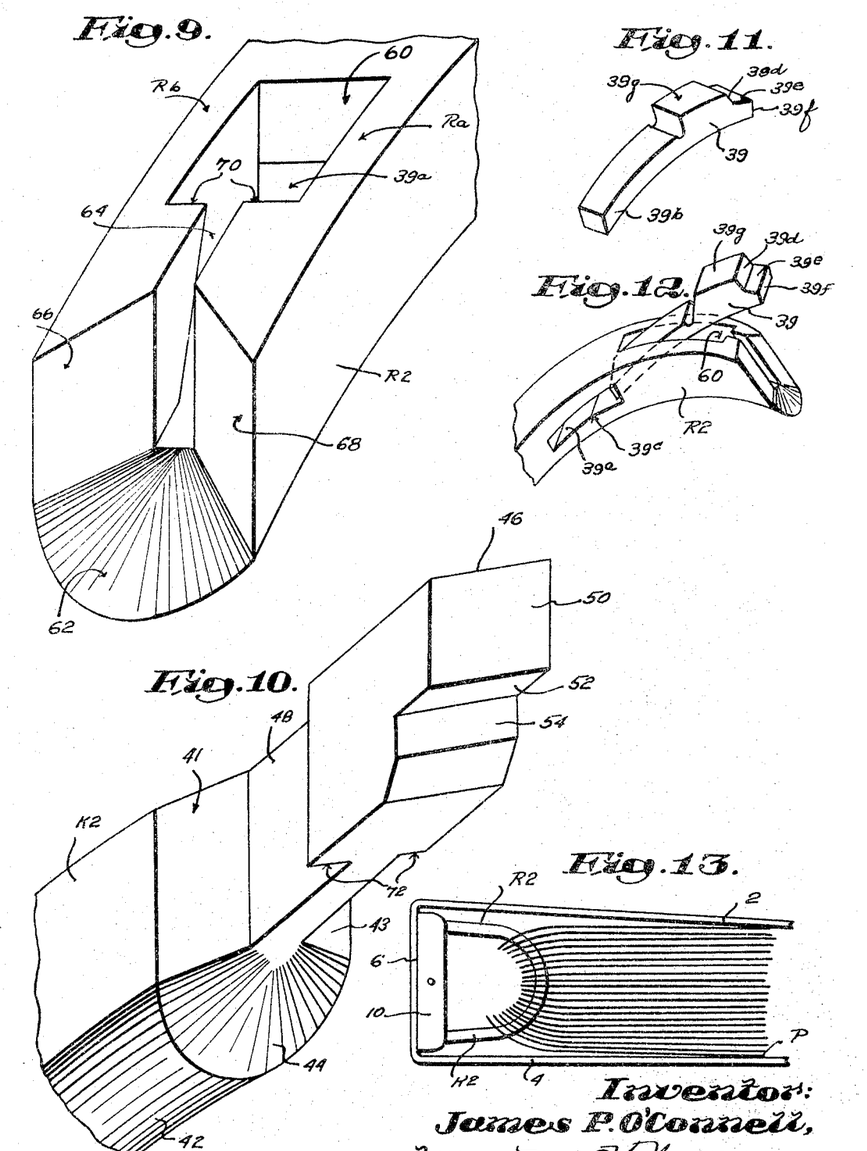
FIGURE 9 is a fragmentary detail perspective view of a slotted receiver ring section corresponding to the ring sections shown at the left hand side of FIGURES 7 and 8.
FIGURE 10 is a fragmentary perspective view of a keying ring section corresponding to the ring sections shown in the right hand side of FIGURES 7 and 8.
FIGURE 11 is a detail perspective view of a locking insert piece employed in the ring sections.
FIGURE 12 is a view showing a slotted receiver ring section with the insert lock of FIGURE 11 partly introduced therein.
FIGURE 13 is a fragmentary elevational view of the notebook of the invention with a multiplicity of pages mounted therein about a non-circular binder ring assembly.

It will also be seen that the two ring sections R2 and K2, when in an engaged position, are inclined toward one another with the result that in a closed position of the front and back covers, as shown in FIGURE 13, there is always maintained a space between the covers and the ring sections and no pressure is exerted on the sheets P at the point where they encircle the ring sections and thus tearing of the ring apertures from such pressure is avoided.

A further important feature of the invention resides in the construction of the slotted receiver ring sections and keying ring sections, and the provision therein of special mating surfaces and locking insert means. Considering these parts in greater detail, attention is directed to FIGURES 9 to 12 inclusive wherein I have illustrated the receiver ring section R2 and the keying ring section K2 on a somewhat enlarged scale, together with a locking insert piece 39 shown both in partly inserted and removed positions relative to the receiver ring section R2.

The ring section K2, as shown in FIGURE 10, is formed with a smooth rounded undersurface 42 whose arc of curvature has a slightly lesser radius than the arc of curvature of a ring aperture of the one-quarter inch variety in the notebook paper sheet P. This rounded undersurface 42 merges with a conically tapered seating surface 44 from which projects a relatively thin web 48 in turn supporting a key portion 46 of substantially larger size. The extremity of the key portion 46 is formed with a series of abutment surfaces which include abutment surfaces 50, 52 and 54 (FIGURE 10). Extending angularly upwardly from the conically tapered seating surface 44 are two angularly converging mating surfaces 41 and 43 which marge with the web 48 angularly at either side thereof as shown in FIGURE 10.

Figure 15:
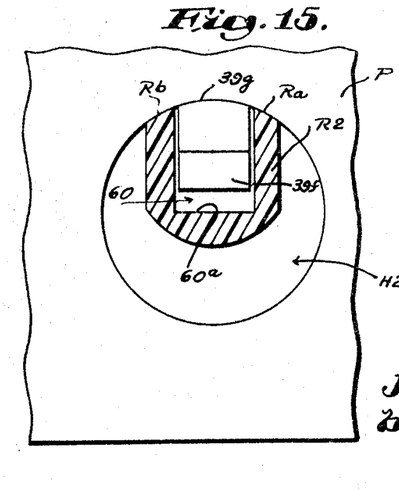
FIGURE 15 is a detail fragmentary elevational view of a sheet of notebook paper illustrating in cross section the top of one of the ring sections of the invention engaged with a ring aperture in the paper.

In a preferred form of the invention, the ring sections K2 and R2, as shown in FIGURE 15, are formed with a smooth rounded top surface whose arc of curvature is designed to conform to the arc of curvature of a ring aperture of the one-quarter inch variety in the notebook paper sheet P.

The slotted receiver ring section R2 is formed with a key slot 60 having side surfaces and inclined end surfaces 70 which are complementary to similar surfaces of the key portion 46 so as to permit the key portion to fit snugly therein. Ring section R2 is also formed with recessed seating surface 62 which mates with the seating surface 44 of the keying ring section K2. Also extending between the key slot 60 and the conically recessed surface 62 is a web retaining slot 64, the entrance to which is defined by angled surfaces 66 and 68 which are adapted to mate with surfaces 41 and 43 of member K2.

In FIGURE 14 it will be noted that the two mating surfaces 70 of the ring section R2, one of which is shown in FIGURE 9, are angled inwardly to mate with similarly angled surfaces 72 of the member K2. As a result of this, the members R2 and K2, when forced together into overlapping relationship with the key portion 46 entering into the key slot 60, tend to slide together into a locked position. This is due to the tension in the compressed ring sections which exerts itself in such a manner that when the surfaces 72 on the key portion begin to mate with surfaces 70 in the key slot, the key portion will be pulled downwardly along the angled surfaces 70 towards the bottom of slot 60; while at the same time the key slot will be pulled upwardly so that its surfaces 70 slide along the angled surfaces 72 until the key portion is fully entered into slot 60.

Figure 6:
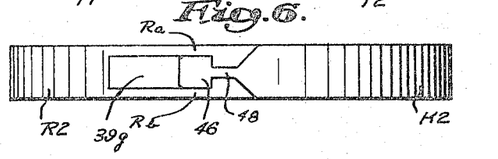
FIGURE 6 is a plan view of the closed ring assembly shown in FIGURE 5.

Simultaneously with the engagement of the key 46 in slot 60, three other matings take place. In the first, the web 48 and the web retainer slot 64 slide downwardly and upwardly respectively into engagement. In the second, the two angular converging surfaces 41 and 43 on the key portion and the angular surfaces 66 and 68 on the recess section slide downwardly and upwardly respectively into engagement. And, in the third, the conically shaped seating surface 44 and the conically shaped recessed seating surface 62 move downwardly and upwardly respectively into engagement to provide a tightly fitted joint which presents a smooth contour along the undersurface, the side surfaces and the top surface at the line of juncture as is suggested in FIGURES 5, 6 and 8.

As earlier noted, I further provide for preventing accidental opening of the members R2 and K2 so that they are held in a fully engaged relationship to one another at all times except when it is desired to insert or remove a piece of notebook paper. This is accomplished by means of the novel locking insert 39 which is contained in the insert slot 39a formed in the member R2 as shown in FIGURES 11 and 12, and also indicated in FIGURE 5. The member 39, as will be observed from FIGURE 11, is formed with an elongated flexible extension 39b which is made with a slight arc of curvature as shown. The slot 39a is formed with substantially rectangular side walls between which the flexible extension is held in a straightened position.

As shown in FIGURE 14, for example, the bottom of slot 39a is made flat throughout a part of its length and terminates abruptly to form a V-shaped fulcrumming edge 39c over which the main body portion of the locking insert 39 projects in spaced relation to the bottom 60a of key slot 60 by reason of the fact that the arcuate extension is forced into a flattened-out or straightened position in the slot 39a. The forward end of the insert necessarily assumes an abutting position against the top edge of the slot 39a and it will be apparent that by applying pressure on the upper side of the insert 39, it may be flexed downwardly towards the bottom surface 60a of the key slot 60.

The locking insert is made of a width slightly less than the width of the key slot 60 so that it may freely flex up and down and the forward portion of the locking element is further formed to provide a curved or crowned top surface 39g which has, in a preferred form of the invention, substantially the same arc of curvature as the adjacent side portions of the key slot 60 as shown in FIGURE 15. The insert 39 is still further formed with stepped mating surfaces 39d, 39e, 39f which are shaped to coincide for mating with the surfaces 50, 52 and 54 of key portion 46. It is to be understood that these surfaces in mating either establish a very light contact with one another or are very slightly spaced apart.

It will be observed therefore that when the ring sections are engaged and the locking insert is at its normally raised position as shown, for example, in FIGURE 5, the surfaces 50, 52 and 54 will snugly abut against corresponding mating surfaces 39d, 39e and 39f respectively and in this position the surface 39f is in locking relationship with the surface 54 in a substantially right angularly disposed relationship such that the ring sections R2 and K2 become held together and cannot be accidentally disengaged by forces acting on the ring sections from any direction. It will be apparent that the only way the ring sections can be disengaged is by selectively forcing the locking insert 39 downwardly in the slot 60 and thereby sliding the surface 39f downwardly past the surface 54 for a short distance. Selectivity is realized because of the arrangement of the locking insert between the two opposite side edges which from the key slot 60. These edges are clearly shown in FIGURE 15 and denoted by the reference characters Ra and Rb. Preferably these edges on Ra and Rb will have curved or crowned upper surfaces which generally correspond with the curvature of the top surface 39g of the insert.

With this arrangement it is pointed out that pressure, for example, from a plurality of pages acting against both the locking insert and the side edges Ra and Rb will not depress the locking insert significantly below the level of the side edges. However, if pressure is exerted by means of a thumb or finger, then a portion of the thumb surface enters between said edges Ra and Rb and the locking insert is forced downwardly below the sides Ra and Rb. FIGURE 15 illustrates an edge of a ring apperture H2 of a sheet P bearing against the side edges Ra and Rb and also the top surface 39g of the locking insert. It will readily be seen from an inspection of these parts that no displacement of the locking insert can occur from pressure of paper either in the form of a single sheet or a large number of sheets.

Figure 7:
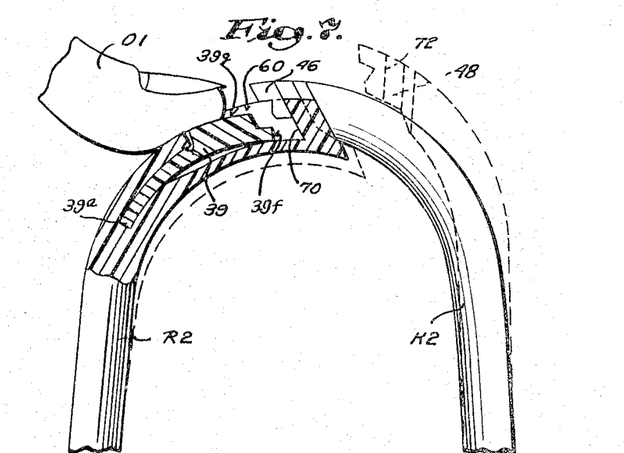
FIGURE 7 is a fragmentary elevational view partly in cross section illustrating the step of applying pressure to one of the ring sections to disengage the sections from one another.
Figure 8:
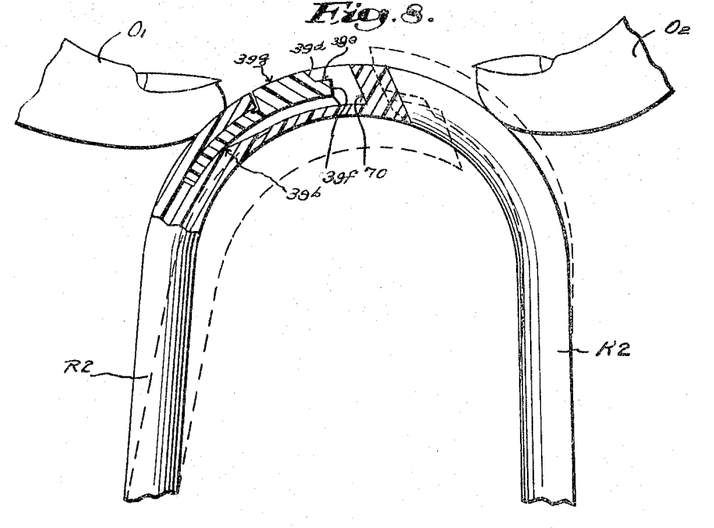
FIGURE 8 is a fragmentary elevational view partly in cross section showing the manner in which the ring sections can be moved toward one another to close them together.

FIGURES 7 and 8 are operational views showing preferred methods for opening and closing the ring sections. Assuming that ring sections such as R2 and K2 are closed as shown in FIGURE 5 and it is desired to disengage the sections, pressure as for example thumb pressure is exerted as suggested in FIGURE 7 by a thumb 0 whereupon two simultaneous actions will take place. The reason for this is that the pressure exerted by thumb 0 entails not only a downward force upon the locking insert, but also upon the body of the ring section R2 itself. In the first action, the locking insert is depressed as described above with surface 39f moving downwardly past surface 54 for a short distance. This releases the key portion 46 and thereby enables the second action to take place; which consists of the key slot 60 being forced by the very same thumb pressure to slide down out of engagement with the key poriton 46. Similarly, the ring assemblies A and B may be separately disengaged.

FIGURE 8 illustrates the operation of engaging the ring sections when they are in an open position by applying pressure from thumbs 01 and 02 to cause the two sections to move together in overlapping relationship as suggested in dotted lines. As soon as the angled surfaces 70 of ring section R2 are brought into contact with angled surface 72 of ring section K2, pressure is discontinued and the tension in the two ring sections causes these surfaces 72 to slide downwardly over surfaces 70 as far as they can go until the key portion 46 is fully entered into slot 60 and a locked relationship is again in effect.

From the foregoing description of preferred embodiments of the invention it will be apparent that I have provided an improved binder ring and backing construction for a notebook in which a novel and convenient association of binder ring elements with the backing can be realized with the ring sections being satisfactorily held at all times. The problem of tearing of ring apertures at the line of juncture in each of these ring assemblies is solved by novel features which provide for a tightly fitted joining of each pair of ring sections. The provision of interlocking key portions with complementary receiver sections and novel locking inserts furnishes a positive means of holding the ring sections against accidental disengagement, and the noncircular shape of the ring sections greatly reduces any possibility of roughening or enlarging or tearing of the edges of paper which define the ring apertures. The arrangement described is very convenient to use and can be instantly and silently opened or closed with a light finger touch pressure and a much longer life of notebook paper may be realized. Moreover, since the engaging and disengaging processes involve no spring snap action, possible injury to the fingers is avoided as is also the possibility of inadvertently displacing sheets of paper in the disengaging process when a large number of sheets are present in the notebook.

In some instances of binder ring applications, it may be desirable to secure individual pairs of ring sections of the type shown in FIGURES 7 and 8 to a loose leaf notebook member in a manner such that each pair of ring sections occur separately of one another. For this purpose I have devised a form of binder ring anchoring base structure shown in FIGURES 16 to 18 inclusive.

Essentially, the unit shown in FIGURES 16 and 17 comprises a flat anchoring base portion 101 preferably constructed of plastic, rubber or other suitable material and a pair of interlocking ring sections 102, 103 having interlocking ends of the same form and construction as has already been described above.

In accordance with this form of the invention the ring sections 102, 103 are resiliently connected to opposite sides of the base 101 by tubular formed hinge portions 104, 105 which in a preferred form are spirally shaped as shown. In one method of manufacture the ring sections may be formed by a plastic molding technique and may constitute an integral part of the respective tubular hinge parts and the base 101. As will be observed from an inspection of FIGURE 17, the inner edges of the tubular or spirally formed hinge portions 104, 105 are formed with rounded ribs 104a, 105a which are designed to slidably engage against curved land surfaces 104b, 105b formed along opposite sides of the anchoring base portion 101 as shown. By means of this arrangement the ring sections 102, 103 may be yieldably supported and may be moved apart as shown in FIGURE 17 or forced toward one another into a locking position such as shown in FIGURE 16. When the ring sections are moved into a closed position the rib portions 104a, 105a coil inwardly and slide around the surfaces 104b, 105b to provide a smooth hinging action without excessively stressing any part of the ring sections 102, 103.

The anchoring base portion 101 is formed with an opening 106 to receive a rivet or other fastening for conveniently and quickly attaching this anchoring base portion to a notebook backing at any desired point therealong depending upon the type of paper and number of ring openings which are desired to be used and notebook paper to be retained in the notebook.

It will be apparent that by thus individually mounting anchoring base portions, a desirable flexibility is realized in mounting the locking ring sections in any desired number and at any desired location in a notebook. It is also to be noted that the relatively long spiralled hinge portion permits a wide arc of flexing through an arc of 180°, for example, without danger of the ring sections being separated or broken off from their respective spiral supporting portions. This is particularly true in moving the ring sections together into a locking position since the ribbed portons 104a, 105a normally tend to slide around into a more fully spiralled position as the ring sections are brought toward one another.

It is also pointed out that the combined anchoring base and ring assembly is a relatively simple type of structure which can be made from a very small number of forming dies and the cost for handling of this type of ring binder forming is reduced and the installation of these separated binder ring sections is greatly simplified.

While I have shown and described a preferred embodiment of the invention, it is intended that changes and modification may be made within the scope of the appended claims.

I claim:
1. A loose leaf notebook construction for loosely holding sheets of notebook paper formed with ring apertures therein, said notebook comprising front and back cover members, binding means for connecting the cover members in hinged relationship, a rigid backing structure secured at the inside of the binding means and including a slotted base and a retaining cap, a plurality of binder rings having annularly shaped tongue extremities engaged in the slotted base and adjustably supported by means of the said retaining cap and each of said rings including a pair of flexible ring sections held under tension and normally acting to move away from one another, said flexible ring sections being supported for limited flexing movement by said retaining cap and each pair of flexible ring sections including a slotted receiver ring section and a keying ring section, the slotted receiver section being formed at its underside with a conically recessed seating surface and the keying ring section being shaped with a conical surface which mates with the conical recessed surface, said keying ring section having a web portion extending upwardly from the conical shaped surface and supporting thereon a key portion which is defined by angular surfaces coinciding with the said angular surfaces of the receiver section, said keying portion being further formed with stepped abutment surfaces which are adapted to lie within the slotted receiver portion in a fully engaged position of the ring sections, a locking insert member fixed in the receiver section and presenting an abutment surface which normally lies in locking relationship with a corresponding abutment surface of the key portion to hold the ring sections in a locked position, and said locking insert member being yieldably supported for movement downwardly into a release position for disengaging the ring sections.

2. A loose leaf notebook structure comprising a pair of hinged covers, a ring anchoring base extending longitudinally between said covers, a plurality of resilient binder ring members mounted in spaced relation for loosely supporting sheets of note paper, each of said binder ring members including a pair of resilient ring sections secured at their lower extremities to said base under tension by forces normally acting to force the opposite ends of the ring sections apart and laterally of said base, one of each pair of said ring sections being provided with a key slot in its upper surface adjacent its head including a socket and a web slot, the outer end wall portion defining said socket being inclined downwardly and inwardly toward the extremity of said ring section, and said slot extending from said inclined wall outwardly through the end of the ring section, a recess formed in one wall of said socket, the other of said resilient ring sections terminating in a headed key section shaped to snugly engage in said socket and recess and including an inwardly inclined end wall for snugly abutting the inclined end wall of said socket, and a resilient locking insert having an elongated flexible extension for seating in said recess in said socket and a headed portion for engaging the head of the key section when fitted in said socket, said locking insert being normally biased outwardly to engage the outwardly inclined face of the key section when in locked position.

3. The structure of claim 2 characterized in that the ring member provided with the key slot in its upper surface adjacent its head has an end portion including inwardly inclined vertical walls which form a juncture with the web slot and the other ring section terminating in a headed key section includes a pair of vertical inclined shoulders for abutting said inclined vertical walls of said first ring member.

4. The structure of claim 3 characterized in that said inwardly inclined vertical walls of the one ring section are connected at their base by a conically recessed surface and the other of said ring sections has the bottom of its inclined walls connected by a similar conically recessed surface.

5. The structure of claim 2 characterized in that the recess formed in the other end wall of the socket for receiving the elongated flexible extension of the resilient locking insert is provided with a projecting portion for engaging the flexible extension to bias the locking insert upwardly.

6. The structure of claim 2 characterized in that the headed key section has the outer end portion of its bottom surface formed with angular faces which are adapted to seat on similar faces formed in the socket of the other ring member.

7. The structure of claim 2 characterized in that the ring anchoring base extending longitudinally between the covers is formed with transverse recesses which receive resilient extensions projecting inwardly at the lower ends of the ring sections.

8. The structure of claim 2 characterized in that the anchoring base extending longitudinally between the covers includes tubularly formed resilient portions of generally spiral form in cross-section and the plurality of binder ring members are mounted at their base on the outer faces of said tubularly formed resilient portions.

9. The structure of claim 2 characterized in that the anchoring base extending longitudinally between the covers includes tubularly formed resilient portions of generally spiral form in cross-section, the free ends of said tubularly formed resilient portions terminating in rounded ribs which slidably engage against the adjacent faces of the base.

References Cited by the Examiner

UNITED STATES PATENTS

| | | | |
|---|---|---|---|
| 724,849 | 4/1903 | Gresham | 129—24 |
| 808,248 | 12/1905 | Morden | 129—1 |
| 820,069 | 5/1906 | Sheridan et al. | 129—24 |
| 833,458 | 10/1906 | Mausherr | 24—230 |
| 876,474 | 1/1908 | Morden | 129—1 |
| 901,076 | 10/1908 | Dawson | 129—1 |
| 991,993 | 5/1911 | Hubby | 129—1 |
| 1,697,644 | 1/1929 | Green | 129—1 |
| 2,265,822 | 12/1941 | Spalding | 129—24 |

FOREIGN PATENTS

| | | |
|---|---|---|
| 787,584 | 7/1935 | France. |
| 98,804 | 4/1923 | Switzerland. |

JEROME SCHNALL, *Primary Examiner.*